(No Model.) 3 Sheets—Sheet 1.

F. BRIGGS.
SPRING MOTOR.

No. 504,907. Patented Sept. 12, 1893.

WITNESSES:

INVENTOR:
Frank Briggs
By his Attorney

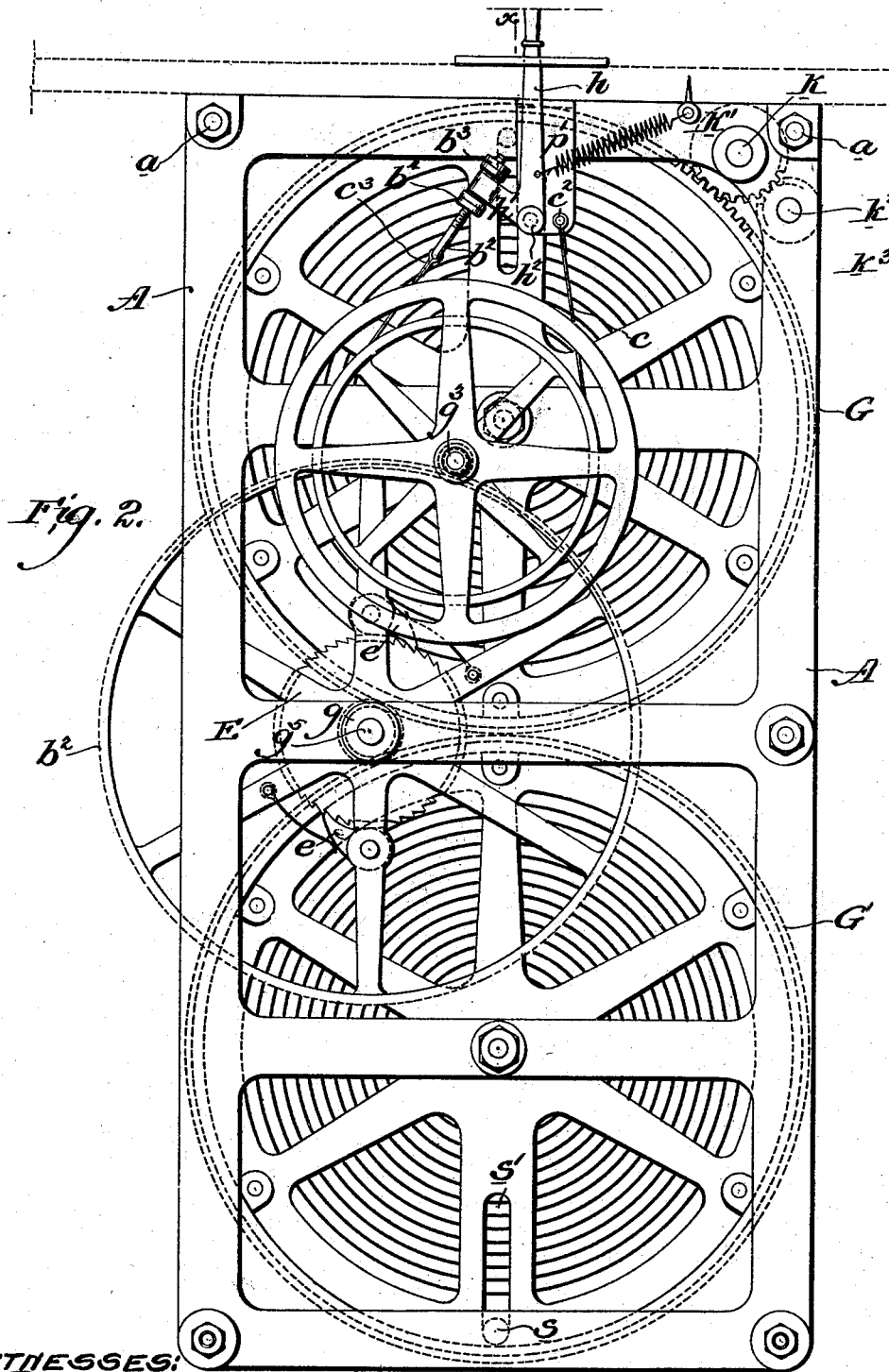

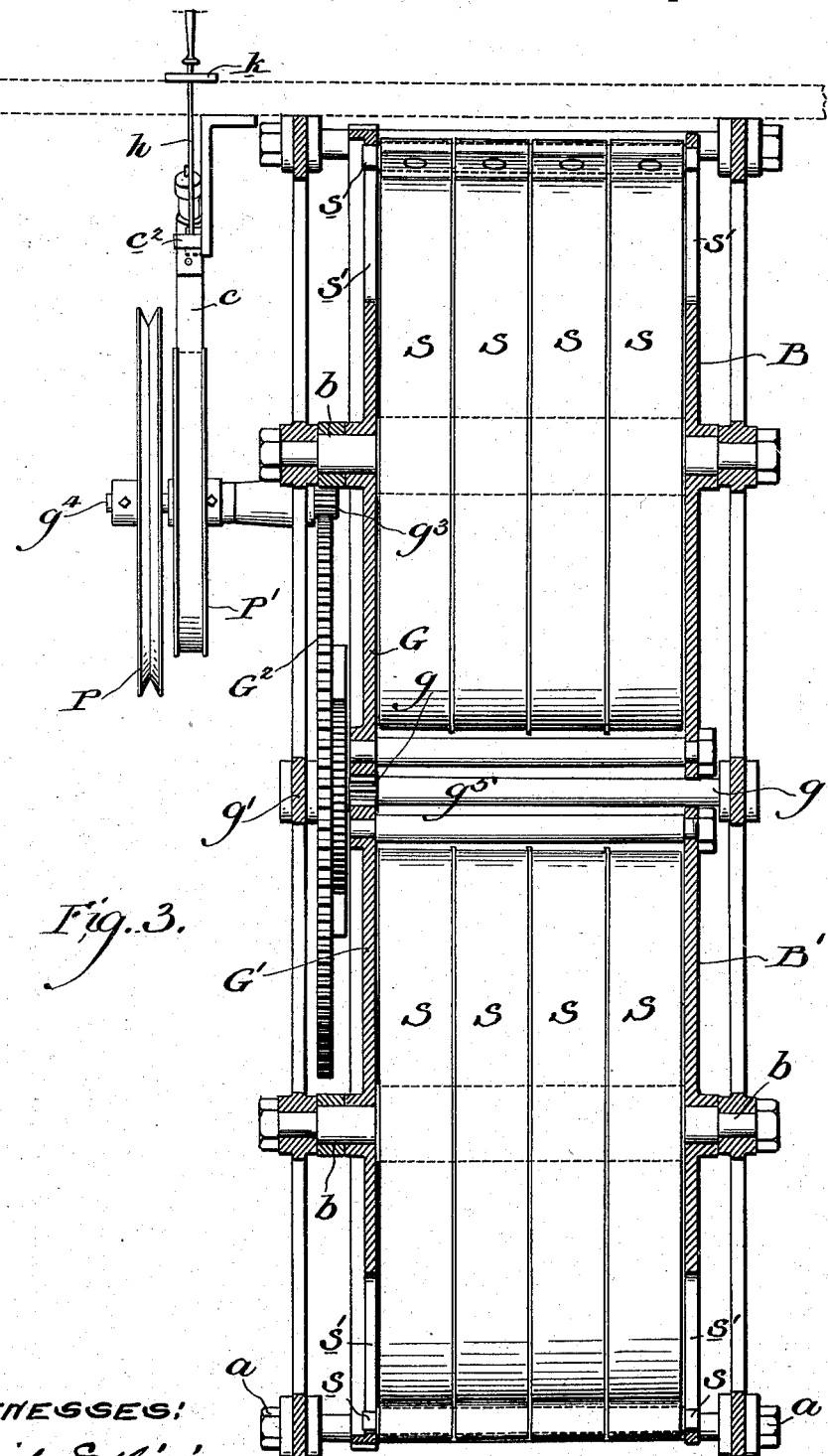

UNITED STATES PATENT OFFICE.

FRANK BRIGGS, OF PHILADELPHIA, PENNSYLVANIA.

SPRING-MOTOR.

SPECIFICATION forming part of Letters Patent No. 504,907, dated September 12, 1893.

Application filed February 13, 1893. Serial No. 462,016. (No model.)

*To all whom it may concern:*

Be it known that I, FRANK BRIGGS, of the city of Philadelphia and State of Pennsylvania, have invented a certain new and useful Improvement in Spring-Motors; and I do hereby declare the following to be a full, clear, and exact description thereof, reference being had to the accompanying drawings, forming part of this specification.

My invention has relation to a spring motor in which the coiled spring is secured at the inner end rigidly to a fixed shaft, and at the outer end adjustable to the drum frames, to provide increased leverage through the expansion of the spring in proportion as the power of the spring decreases, and consists in the construction hereinafter particularly claimed.

I am aware that other constructions of spring motors have heretofore been invented in which the outer end of the spring is provided in an adjustable bearing, and do not claim the same broadly.

The object of my invention is to provide a spring motor especially for sewing machine service, preferably of a construction as hereinafter particularly described, in which the adjustable outer end of the spring will automatically adjust itself evenly and regularly toward the circumference of the drum, as the spring uncoils, without the intervention of auxiliary mechanism other than the mere expansion of the spring.

A further object of my invention is to overcome the difficulty in spring mechanism, wherein a spring exerts its greatest power when fully wound, with a corresponding decrease of power as the spring unwinds.

A further object of my invention is to secure the greatest possible average power from the spring and at the same time to allow all parts of the spring to uncoil evenly and regularly without the loss of power through the friction of its coils, and as the power of the spring decreases the leverage toward the circumference of the drum shall proportionately increase through the adjustable bearing of the outer end of the spring and the ratio of power be thus approximately and evenly maintained until the power of the spring is fully expended.

A further object of my invention is to provide, in a compact form, a motor of high power, easily wound, and capable of running for a long period of time without re-winding, and of driving the power connecting wheel at any desired speed and readily governed by a brake appliance constructed for the purpose.

Figure 1:
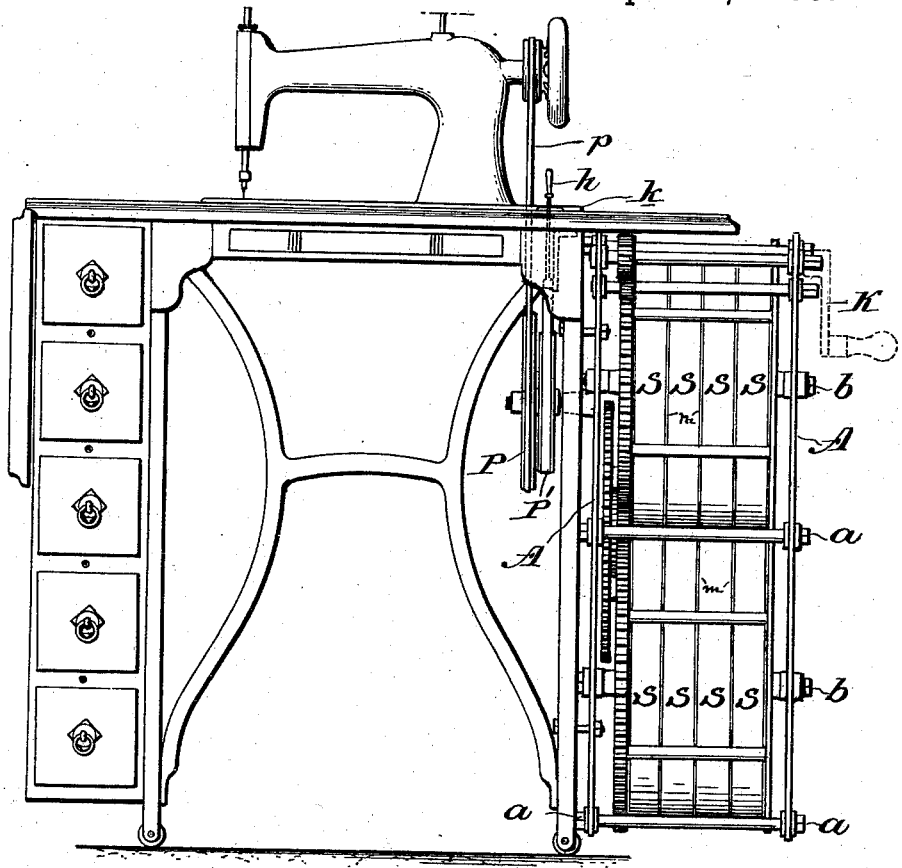
Figure 5:
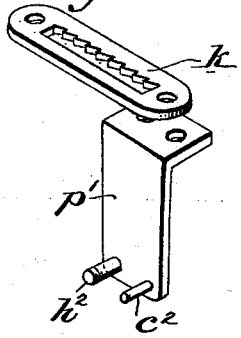
Figure 4:
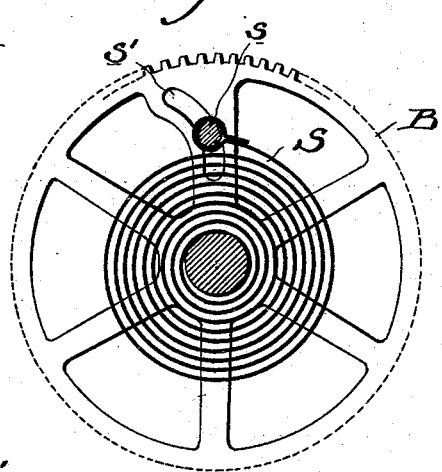
Figure 6:
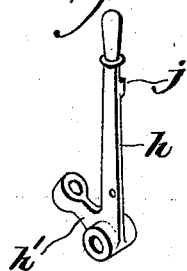

In the accompanying drawings Figure 1 is a front elevation of my improved motor applied to a sewing machine. Fig. 2 is a side elevation from the left of Fig. 1. Fig. 3 is a partially longitudinal sectional view upon the line $x$—$x$ of Fig. 2. Fig. 4 is a side elevation of the coiled spring and drum showing the preferable construction of the improved adjustable outer bearing. Fig. 5 is a detailed view of detached rack and supporting bar for the hand-brake. Fig. 6 represents the lever of the hand-brake, detached.

The main frame, A, of the motor is joined together as by the bolts, $a$, and securely bolted to the machine. The drums, B, B', similarly constructed having their outer walls secured together through the medium of transverse bolts, are loosely journaled in the frame, A, upon the fixed shaft bearings, $b$, which are rigidly secured at either end to the frame, A; each drum is provided with a large gear-wheel, G, G', operating in the same direction and each gearing into the small gear wheel, $g$, journaled at, $g'$, in the frame of the machine, A, upon a fixed shaft, $g^5$; the large gear wheel, $G^2$, is loosely carried upon the shaft, $g^5$, of the gear wheel, $g$, and gears into the small gear wheel, $g^3$, rigidly provided upon the shaft, $g^4$, suitably journaled to the frame, A; the shaft, $g^4$, also has adjustably keyed upon it the pulley or power connecting wheel, P, preferably grooved, as illustrated in the drawings, for driving the sewing machine, or other machine to be driven, as through the medium of the belt, $p$. The band wheel, P', is also adjustably provided upon the shaft, $g^4$, and keyed thereto, around the circumference of which wheel is provided the band, $c$, rigidly secured as at $c^2$, to the plate, $p'$, which is provided to the base of the sewing machine table or to the frame of the machine. The other end of the band, $c$, is secured at $c^3$, preferably adjustable by a screw-threaded bolt, $b^2$, and thimbles, $b^3$, and $b^4$. The adjustable end of the band, $c$, is preferably secured to the short arm, $h'$, of the lever, $h$, which is pivoted at $h^2$. By this construction the band, c, may be tightened upon the band wheel, P', and the motor stopped, or the speed regulated, by a simple adjustment of the lever, h. In the same manner by a release of the band, c, the motor may be allowed to run at full speed, if desired. The drums, B, B', are preferably provided with a series of coiled springs, S, secured at their inner ends rigidly to the axis of the drum as by a pin, rivet, or by other suitable means. The outer ends of the springs, S, are secured to a transverse bolt, or shaft, s, which has its outer ends provided within the grooves, s', in the circumferential plates or spokes of the drums, B, B'. I preferably construct the grooves, s', in the segment of a circle, eccentric to the axis of the drum, for instance, preferably as shown in Fig. 4, though the grooves or slots, s', if desired, may be radially provided. I preferably provide between each spring, S, an interposing circular plate, m, to keep the several springs separate.

In the construction described of the adjustable outer bearing of the spring, especially in the preferable construction shown in Fig. 4, I secure an even and regular adjustment of the outer bearing of the spring, as the spring gradually uncoils without the intervention of cumbersome auxiliary mechanism for automatically regulating the adjustment. In my construction described the tension upon the outer end of the spring, S, as it uncoils advances the bolt, or shaft, s, outwardly in the grooves, s', and as the strength of the spring decreases the leverage of the spring upon the drum will increase as the distance between the axis of the drum and the position of the bolt, or shaft, s, increases. Rollers, if desired, may be provided upon the bolt, s, in the slot, s', to reduce friction.

In the construction of the grooves, s', in the segment of a circle eccentric to the axis of the drum, I desire to place the grooves or slots at such an angle that the slightest pressure through the expansion of the spring will cause the bolt, or shaft, s', to rise and thus increase the leverage with the least possible friction upon the coils of the spring.

An advantage of the eccentric construction of slot shown in Fig. 4 is that as the spring uncoils the outer end or bearing will be prevented from springing out toward the circumference too rapidly—the incline of the arc of the circle tending as the spring uncoils to slightly retard it and draw the bearing up and in the opposite direction from the pull of the spring.

In the construction of machine described I provide the winding spindle, k, with the small gear wheel, k', gearing into the large gear wheel, G. A key is provided upon the spindle, k, into which the crank-handle, K, may be fitted for winding purposes; I also provide an auxiliary winding spindle, $k^2$, carrying a gear wheel, $k^3$, gearing into the gear wheel, k', upon which the crank, K, may be adjusted and the springs wound up through the train of gearing, shown in the drawings, more slowly, but with less power required. A rack wheel, E, to which is rigidly fixed the small gear wheel, g, is loosely provided upon the shaft, $g^5$, with pawls, e, provided on the gear wheel, $g^2$, fitting into the teeth of the rack to allow of the winding of the machine without operating the power-connecting gearing. The rack, k, shown in Fig. 5, is secured to the table of the machine and allows the brake-handle, h, to be set at any desired position through the medium of the pawl, j, provided upon said handle, h.

I am aware that various devices have been employed for accomplishing this gradual adjustment of the outer end of the spring, but in such of these devices with which I am familiar, the slots in which the spring carrying bar travels, are so arranged as to offer either an amount of resistance to the outward travel of the bar which the spring cannot overcome, or else being either on a radial line or curved on a line concentric to the normal tendency of travel of the end of the spring, will offer so little resistance that the bar will be traveled outward immediately, the inclination or curve being such as to assist the expansion of the spring. With a guiding slot curved as shown in Fig. 4, there is at all times a slight tendency to depress or hold the bar or bolt in toward the center of rotation and prevent too rapid expansion and as the spring expands, the bolt must travel in a direction contrary to the expansive tendency of the spring.

Having thus described my invention, what I claim, and desire to secure by Letters Patent, is—

1. The combination in a spring motor, of a drum, a coiled spring secured at its inner end to the axis of the drum, and at its outer end to a transverse bolt or bar, the walls of said drum having guiding slots or grooves to which the bolt or bar is adapted, said slots or grooves being curved on a line opposite, or nearly so, to the line in which the end of the spring normally tends to travel from the center to the circumference of the drum, substantially as specified.

2. The combination in a spring motor, of a drum, a coiled spring secured at its inner end near the axis of the drum, a bow shaped slot provided in each of the side walls of the drum between the axis and periphery thereof, that end of each slot nearest the periphery extending rearwardly and away from the line in which the end of the spring normally tends to travel from the center to the periphery of the drum, and a transverse bolt or bar provided in said slots and carrying the outer end of said spring, substantially as specified.

In witness whereof I have hereunto set my hand this 11th day of February, A. D. 1893.

FRANK BRIGGS.

Witnesses:
JOHN C. GALLEN,
J. HENDERSON.